United States Patent [19]

Renato

[11] 4,449,698
[45] May 22, 1984

[54] AUTOGENOUS PORTABLE WELDING APPARATUS

[75] Inventor: Rinaldi Renato, Modena, Italy

[73] Assignee: Uniox SRL Welding & Cutting, Bologna, Italy

[21] Appl. No.: 480,784

[22] Filed: Mar. 31, 1983

[51] Int. Cl.³ ............................................... B23K 7/00
[52] U.S. Cl. ...................................................... 266/48
[58] Field of Search ........................ 148/9, 9.5; 266/48, 266/66

[56] References Cited

U.S. PATENT DOCUMENTS

| | | | |
|---|---|---|---|
| Re. 16,307 | 3/1926 | McCutcheon. | |
| 2,680,486 | 6/1954 | Carpenter | 148/9 |
| 2,680,487 | 6/1954 | Carpenter | 148/9 |
| 2,862,765 | 12/1958 | Wing | 299/86 |
| 3,019,197 | 1/1962 | Saunders | 252/477 |
| 3,029,807 | 4/1962 | Webster | 126/271.2 |
| 3,253,787 | 5/1966 | Stutzman | 239/305 |
| 3,607,066 | 9/1971 | Basch | 23/212 |
| 3,724,444 | 4/1973 | Varona | 126/237 |
| 3,732,060 | 5/1973 | Churchill | 431/344 |
| 3,739,574 | 6/1973 | Godfrey | 60/39.03 |
| 3,741,135 | 6/1973 | Thompson | 110/22 |
| 3,907,490 | 9/1975 | Schaller | 431/142 |
| 4,103,829 | 8/1978 | Zagara et al. | 239/304 |
| 4,133,301 | 1/1979 | Fujiwara | 126/413 |
| 4,167,932 | 9/1979 | Zebuhr | 126/208 |
| 4,315,732 | 2/1982 | Rowbottom | 431/344 |

*Primary Examiner*—W. Stallard
*Attorney, Agent, or Firm*—Lilling & Greenspan

[57] ABSTRACT

An autogenous portable apparatus is described for welding and oxygen cutting operations which uses a combustible gas fuel and oxygen derived from the decomposition of hydrogen peroxide flowing through a catalyst of lead chips. The catalyst is positioned to allow priming by initial quantities of hydrogen peroxide to be injected into the catalyst by the action of gravity. Once oxygen is formed the pressures thereof are fed back to the container holding the hydrogen peroxide thereby pressurizing the same and cause increasing quantities of oxygen to be produced until the desired level has been reached. Condensers are provided to condense the water vapor also formed in the conversion process to purify the oxygen prior to use thereof at a welding torch. A fluid control valve regulates the flow of the hydrogen peroxide at a rate inversely to the pressure of the oxygen to thereby maintain the pressure below a maximum predetermined value.

32 Claims, 11 Drawing Figures

AUTOGENOUS PORTABLE WELDING APPARATUS

BACKGROUND OF THE INVENTION

The present invention generally relates to welding equipment and, more specifically, to autogenous portable welding apparatus.

While numerous gaseous fuels are used for welding and brazing, high temperature welding and cutting operations invariably require mixtures of gaseous fuels with oxygen. Since oxygen is typically supplied from high pressure cylinders, such welding systems are seldom portable or easily transportable because of the generally large sizes and heavy weights of the high pressure oxygen cylinders.

Small units have been developed to accommodate the needs of artisans in the field and hobbyists. Some of thee units have been described as autogenous because, during operation, they are self-sustaining and provide both the gaseous fuel as well as oxygen, which is self-generated.

Autogenous units typically use a low pressure source of combustible gas such as butane or propane cartridges. However, these units in addition, incorporate a small oxygen generating plant which typically decomposes hydrogen peroxide. For example, in U.S. Pat. No. 4,308,235, a portable welding apparatus is described for welding by means of an oxygen-gas flame. However, since the oxygen generator yields low pressure oxygen, the method used for increasing the pressure of the oxygen to a level compatible with the fuel delivery pressure is to connect the fuel supply to the oxygen generator. However, such a system is not truly autogenous since the pressurization of the system depends on an external source such as from a pump, a pressure cylinder or, as noted, a gas source. Where a gas source is used, the use of a combustible gas to pressurize the hydrogen peroxide creates a potentially hazardous condition. Thus, while such units have been known, they have not achieved commercial success because of their complexity and inconvenience of use and as a result of their defects in both operation and in safety of use.

SUMMARY OF THE INVENTION

It is an object of the present invention to provide a autogenous portable welding apparatus which is completely self-sustaining and does not depend upon external sources for pressurization.

It is another object of the present invention to provide an autogenous portable welding apparatus which is simple and convenient to use for welding and oxygen-cutting operations.

It is still another object of the present invention to provide an autogenous portable welding apparatus which can provide very high welding temperatures.

It is yet another object of the present invention to provide an autogenous portable welding apparatus which includes safety features allowing the same to be used under varying conditions with complete safety.

In order to achieve the aforementioned objects, as well as other objects which will become apparent hereafter, the autogenous portable welding apparatus in accordance with the present invention includes a container for receiving a readily decomposable liquid capable of yielding a combustible gas. Conversion means are provided having an input thereof connected to the container for receiving the decomposable liquid and for effecting conversion at a rate which is a function of the rate of flow of the decomposable liquid through the conversion means. Means are provided for selectively releasing the combustible gas to a torch. Conduit means are provided for transmitting the increased pressures developed at the output of the conversion means during the conversion process to the container to increase the rate of flow of the decomposable liquid through the conversion means. Liquid flow control means are also provided disposed between the container and the conversion means for regulating the flow of the decomposable liquid through the conversion means as a function of the pressure in the container to thereby maintain a desired gas generation rate.

According to a presently preferred embodiment, a fuel-oxygen flame is achievable by use of a combustible gas fuel and oxygen derived from the decomposition of hydrogen peroxide. Initial quantities of hydrogen peroxide are primed from the hydrogen peroxide container to the conversion means. The conduit means feeds back the pressure of the oxygen and the output of the conversion means to the hydrogen peroxide container to pressurize the same and cause, once primed, increasing quantities of oxygen to be produced until the desired level of oxygen production has been reached. The liquid flow control means regulates the pressure of the oxygen and maintains the same below a maximum predetermined value.

BRIEF DESCRIPTION OF THE DRAWINGS

Other and further objects of this invention will be more apparent hereafter from an examination of the specification and claims in conjunction with the accompanying drawings, wherein:

DESCRIPTION OF THE PREFERRED EMBODIMENTS

Figure 1:
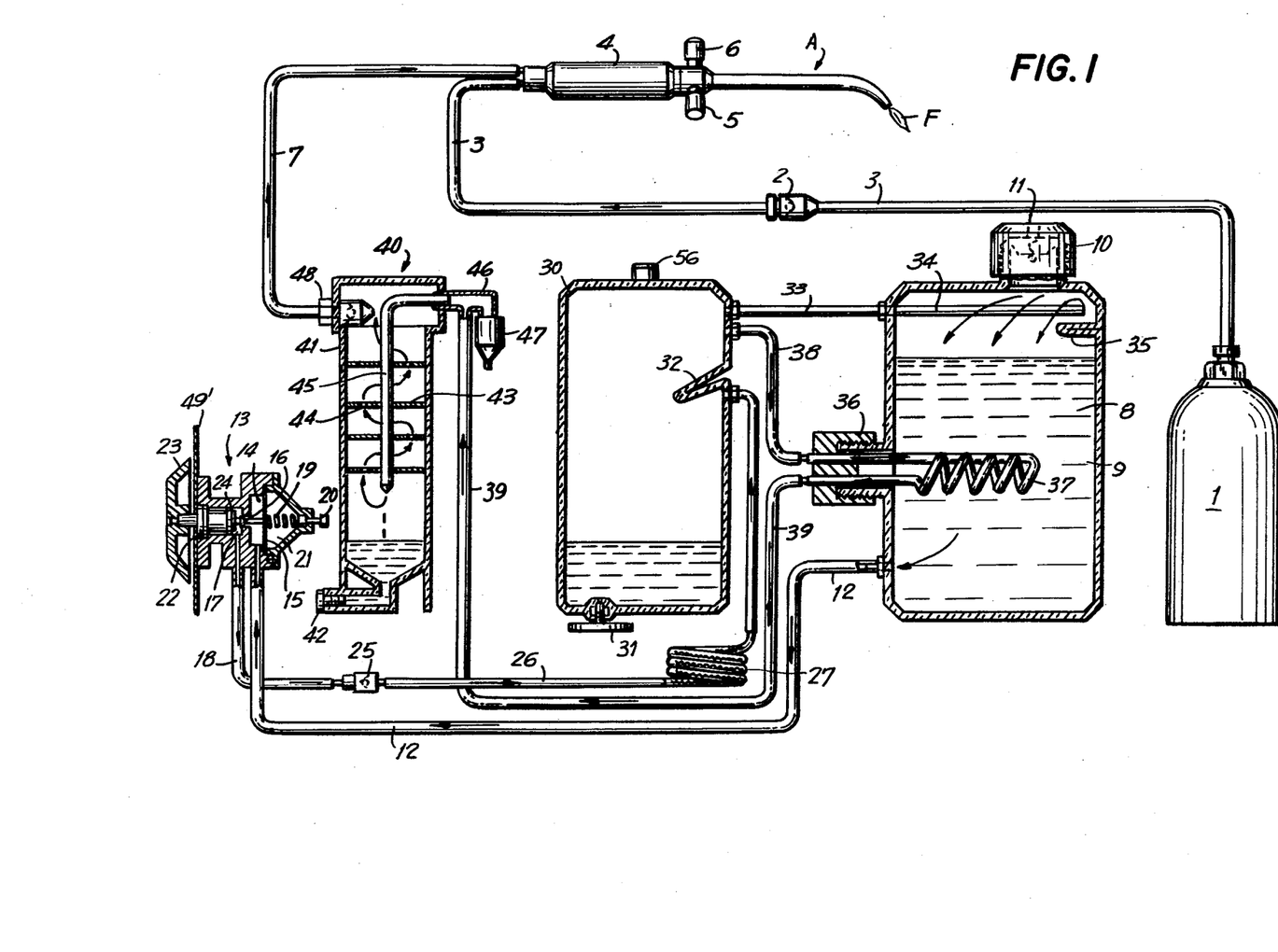
FIG. 1 is a diagrammatic view, with certain components in cross-section, of one embodiment of the autogenous portable welding apparatus in accordance with the present invention.
Figure 2:
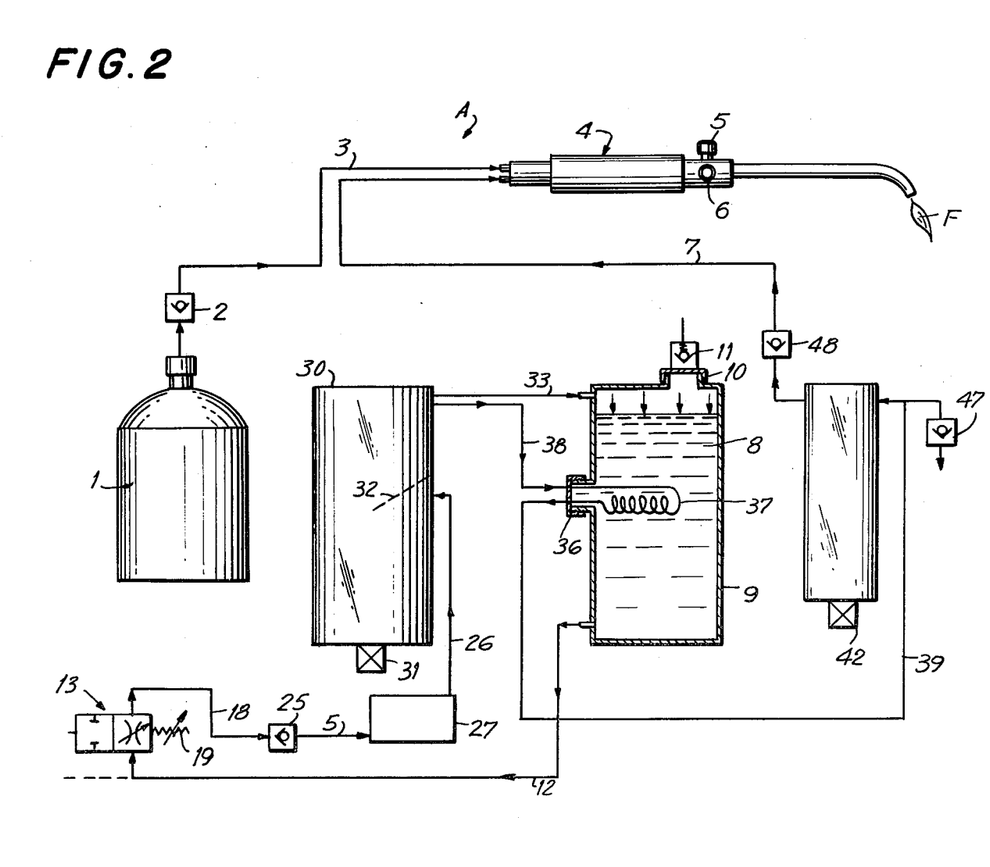
FIG. 2 is a flow chart showing the flow directions of liquids and gases in the embodiment shown in FIG. 1.

Turning now to the drawings, in which identical or similar parts are designated by the same reference numerals throughout and first referring to FIGS. 1 and 2, an autogenous portable welding apparatus in accordance with the present invention is shown and designated generally by A. The apparatus A includes a combustible gas cartridge 1 which serves as a source for any combustible fuel, commercially available, such as methane, propane, acetylene or the like. The combustible gas or fuel circuit includes a single-direction valve 2 placed in line or conduit 3 which connects the cartridge 1 to one of the paths of a welding blow pipe or torch 4. The torch is provided with conventional valves 5 and 6 which make it possible to selectively regulate both the flow of the combustible gas and that of the combustion-supporting gas, namely, oxygen, coming to the torch from another line or conduit 7.

An important feature of the present invention is the oxygen generating system, the means for pressurizing the same, and for regulating the pressures therein to allow reliable and safe operation. The oxygen generating system, in the embodiment A to be described, utilizes hydrogen peroxide 8 which is placed in a container 9 preferably made of a transparent or translucent material for reasons to be described. The container 9 is provided with a threaded opening closed tight by a plug 10. Advantageously, a calibrated valve 11 is mounted on the plug 10 for reasons to be discussed. A line or conduit 12 leads from the lower part of the container 9 for feeding the hydrogen peroxide to a unit 13 which is in the nature of an automatic fluid flow regulating valve which regulates the liquid flow rate therethrough as a function of fluid pressure. The valve 13 forms an important feature of the present invention since it automatically regulates the pressures within the system and limits the pressures to acceptable or desirable levels to render the welding apparatus safe and reliable.

Figures 3, 4:
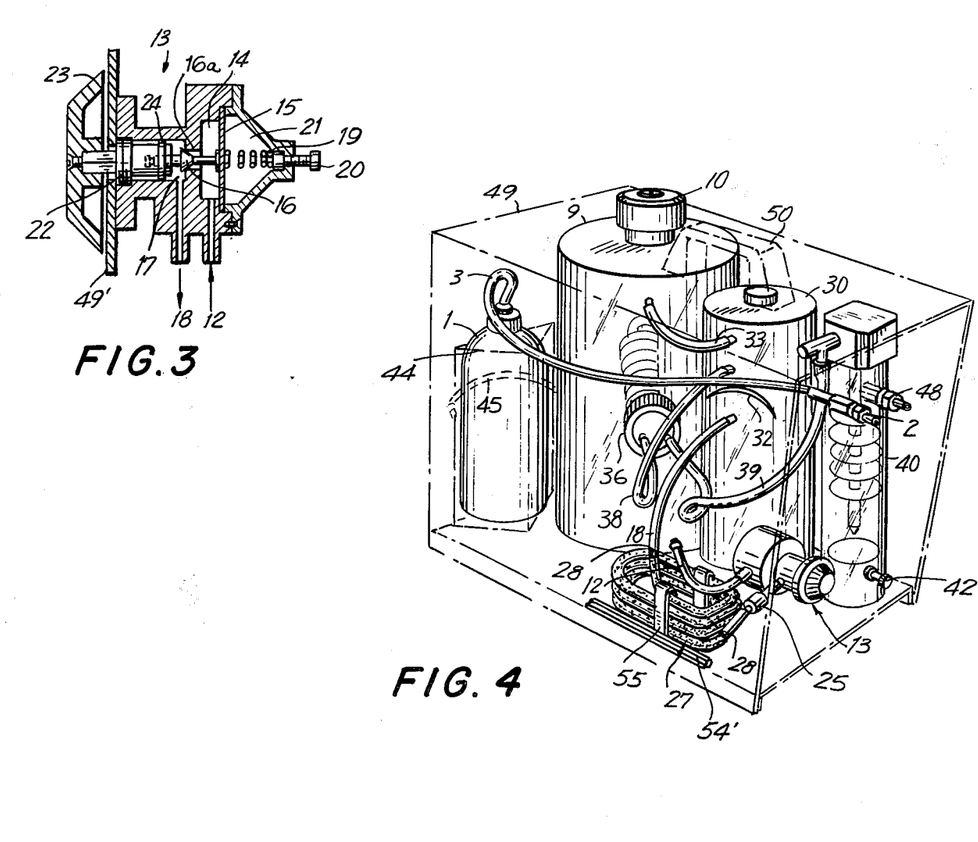
FIG. 3 is an enlarged cross-sectional view of the automatic flow regulating valve shown in FIG. 1 and diagrammatically shown in FIG. 2.
FIG. 4 is a perspective view of the embodiment as shown in FIGS. 1 and 2, and showing the manner in which the various components are arranged within a housing which is shown in phantom outline.

Referring specifically to FIG. 3, the unit 13 has a chamber 14 with which line 12 is in fluid flow communication. One of the walls of the chamber 14 is in the nature of an elastic membrane 15 to which there is attached a shank of a conical valve 16 which is configurated and dimensioned to be at least partially receivable within an opening 16a which connects the chamber 14 with an adjacent chamber 17 which is in fluid flow communication with a line or conduit 18 as shown. The conical valve 16 is biased axially by a cylindrical helical spring 19 which acts on the elastic membrane 15 and restores the same to its normal position when fluid pressures in the chamber 14 are reduced. There is advantageously provided a pre-stressing means, such as an adjusting screw 20, for adjustably setting the restoring forces on the elastic membrane 15. In this connection, there may also be provided a calibrated scale for providing a visual indication of the operating parameters of the valve 13 as a function of the screw 20 position. The screw 20 is lodged in chamber 21 which is placed in free communication with the atmosphere so that the elastic membrane 15 is exposed to atmospheric pressure and the biassing force of the helical spring 19 on one side thereof, while being exposed to the pressure of the fluid in the chamber 14 on the other side thereof.

Additionally, the chamber 17 is at least partially threaded, as shown, and a screw 22 is threadedly meshed therein which is provided with a packing material 24 for sealing relationship with the smooth part of the chamber 17 and for cooperation with the conical valve 16. A handgrip or knob 23 is shown supported or mounted on screw 22 for facilitating rotation thereof.

The regulating valve 13 is mounted on a housing wall 49' to expose the handgrip or knob 23 exteriorly thereof. On turning the screw 22 fully inwardly into the chamber 17, the conical valve 16 closes the opening 16a between the chambers 14 and 17 by blocking the same. Conversely, turning the screw outwardly releases the conical valve 16 from the influence of the packing 24 and the conical valve is again brought under the influence of the spring 19. At low pressures, as suggested, the conical valve shank, which is connected to the elastic membrane 15, will move towards the left, as viewed in FIG. 3, thereby increasing the effective area of the opening 16a. This allows a greater flow of hydrogen peroxide in the lines 12, 18. As pressure in the fluid and, therefore, in the chamber 14 increases the elastic membrane 15 and the shank of the conical valve 16 are urged towards the right, as viewed in FIG. 3, against the biassing action of the helical spring 19. This causes the conical valve 16 to be at least partially received within the opening 16a thereby reducing the effective area of the opening and the rate of permissible flow. Ultimately, of course, when the pressure in the fluid and in the chamber 14 reach a predetermined level, as preselected by the calibrating screw 20, the conical valve 16 totally blocks the opening 16a separating the chambers 14, 17 and the flow of hydrogen peroxide in lines 12–18 is totally stopped.

A unidirectional valve 25 is placed in line or conduit 18 for reasons to be discussed. To the outlet of the valve 25 there is connected a line or conduit 26 which is also preferably made of a plastic material which may include or incorporate therein conversion means or a reaction circuit for decomposing the decomposable liquid, in this case hydrogen peroxide. Alternately, the conversion device, identified by the reference number 27, may be a separate unit which is placed in the fluid path of the line 26. In the presently preferred embodiments being described, where a decomposable liquid is hydrogen peroxide, the conversion device is the nature of a catalytic material in the form of a porous mass which on contact with the hydrogen peroxide will cause the liquid to decompose into water vapor and oxygen in a well known manner. The catalytic material may, for example, consist of galvanically treated lead chips, although other catalytic materials may be used with varying degrees of advantages. Where the catalytic conversion takes place in a section of the line 26, plugs 28 (FIG. 4) are advantageously used at each end of the line 26 portion which contains the catalytic material, with each plug provided with at least one hole of suitable diameter to permit flow of the peroxide through the line 26 while minimizing the migration of the lead chips within the line 26.

Since the system initially exhibits low pressures, as to be described, the apparatus is provided with a priming arrangement for initially injecting quantities of the hydrogen peroxide into the catalytic conversion section 27 to initiate the conversion process and achieve levels of pressure in the container 9 which render the conversion process self-sustaining as to be described. Such priming may be by mechanical means, such as a priming bulb.

However, in the embodiment being described, the priming is achieved by disposing the section of tube 26 and the catalytic material 27 at a level in relation to the container 9 so that the hydrogen peroxide flows into the catalytic section 27 by the action of gravity. As will become evident hereafter once the oxygen generating plant has been primed and conversion has proceeded to bring the system to normal operating conditions, the pressures developed in the system are sufficient to maintain the operation on a continuous basis without additional priming.

The terminal part of the line 26 on the output side of the catalytic section 27 discharges into the intermediate zone of a container 30 which is likewise preferably of plastic material which is transparent or translucent for reasons to be described. The container 30 is provided at its undersurface with a discharge valve or cock 31 for discharge of condensation liquid collected in the container. The container 30 is advantageously provided with an internal projection or deflecting member 32 which is provided at the point of entry of the line 26 as shown for diverting the water vapor and oxygen released at the output of the catalytic section 27. The projection or deflecting member 32 creates a turbulence of the water vapor and, by increasing the flow path thereof, assists in cooling the water vapor and results in some of the water vapor being condensed. The container 30, therefore, acts as a collecting tank for the condensed water vapor.

A line 33 is placed in fluid flow communication with the collecting tank or container 30 above the projection or deflecting member 32 and is connected to a rigid tube 34 which empties into the top of the hydrogen peroxide container 9. Advantageously, the container 9 is also provided, at the discharge end of the tube 34 with a projection 35 which compels fluid at the outlet of the tube 34 to follow a winding course.

The container 9 is preferably provided with an intermediate pipe union sealed by a plug 36, which sealingly receives the input and outlet ends of a coil 37 immersed in the hydrogen peroxide mass 8. One end of the coil 37 is connected to line 38, which departs from the top of the collecting tank 30, while the other end of the coil 37 is connected to line or conduit 39 which is in fluid flow communication with a condensation unit generally identified by the reference 40.

The condensation unit 40 includes a container 41 preferably made of a plastic material which is transparent or translucent, for reasons to be described, and provided with a discharge valve or cock 42 for the discharge of condensation liquid. The unit 40 is also provided with a number of horizontal division baffles 43 which bear eccentric holes 44 suitably staggered among themselves. Diaphragms 43 are traversed axially with good sealing by tube 45 which is open at its lower end in the direction of the bottom of the container 41, and it is connected with its upper end to a shunt sleeve 46 to which line 39 and a unidirectional valve 47 are connected. The unidirectional valve 47 places the oxygen circuit in free communication with the atmosphere as soon as a preselected pressure has been attained in the oxygen circuit. A unidirectional valve 48 completes the oxygen circuit and it is preferably placed on the cover of the container 41 and connected to line 7 which feeds the blow pipe or torch 4.

Figure 5:
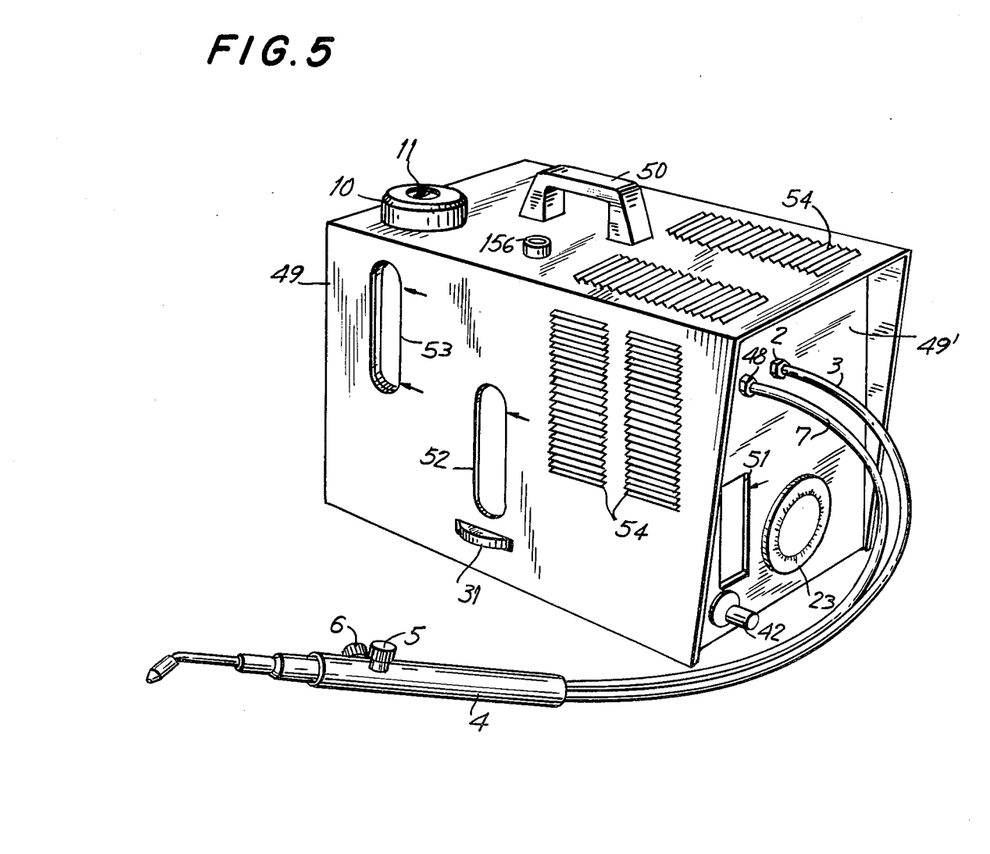
FIG. 5 is a perspective view of the apparatus similar to FIG. 4 but showing the exterior of the housing and the functional features associated therewith.

Referring to FIGS. 4 and 5, a possible arrangement is shown of the various above-described elements or components within a housing 49 which renders the unit A easily portable. Housing 49 is provided with a handle 50 and equipped with vertical slits 51, 52 and 53 for visualization of the levels within containers 41, 30 and 9, respectively, which are arranged in the vicinity of these slits. Controls for activating drainage valves 42 and 31 are provided below slits 51 and 52, respectively. Housing 49 is also provided with aeration slits 54 on both the side walls and the bottom wall of the housing 49 for enhancing ventilation through the unit and for removal of heat radiated therein.

When line section 26 is used as a reaction circuit by containing, in a length thereof, the catalytic material 27, the line section is advantageously provided in spiral form as shown in FIGS. 1 and 4 and is kept in position by suitable retainers 55 proximate to the ventilating slits mentioned, indicated with the reference numeral 54', to allow efficient removal of heat from the catalytic conversion material which is the subject of the greatest heating and for separating such catalytic material 27 from other components of the system which may become damaged from excessive heat.

Still referring to FIGS. 3 and 4, the hydrogen peroxide container 9 is shown locked in position by its own plug 10 which rests against the wall of the housing 49. The collecting tank or container 30 can be locked in position in the same manner by providing a small threaded plug 156 which can be screwed onto a threaded portion 56 shown in FIG. 1.

The condensation container 41 is attached to the front of the housing 49 by the unidirectional valve 48 and by the body of the bottom discharge valve or cock 42. The body of the fluid regulating valve 13 is attached to the same front panel or wall of the housing 49. Unidirectional valve 2 is also mounted, preferably in the vicinity of the valve 48, so that lines 3 and 7, which feed the blow pipe or torch 4 can be collected as a bundle.

To facilitate replacement of cartridge 1, the cartridge can, for example, be placed in a small compartment formed by a partition 44 located at the rear of the housing 49 and in which the cartridge itself may be held by any suitable means such as by an elastic band 45.

The operation of the welding apparatus A will now be described.

Before the unit is turned on, or while the unit is at rest, the gaseous fuel and oxygen valves 5 and 6 are closed and the screw 22 of the regulating valve 13 is screwed inwardly so that the conical valve 16 closes the opening 16a between chambers 14 and 27 thereby preventing the flow of hydrogen peroxide from the container 9 to the catalytic conversion unit 27. There is no production of oxygen under these conditions.

To commence the conversion process and, therefore, the generation of oxygen, it is sufficient to unscrew screw 22 sufficiently to remove the same from the region where it may influence the position of the conical valve 16. The spring 19 thereupon urges the conical valve 16 to move out of blocking relationship with respect to the opening 16a thereby placing chambers 14, 17 in communication with each other. Initially, prior to conversion of hydrogen peroxide, the hydrogen peroxide contained in container 9 begins to flow, as a result of gravitational forces, through line 12, the regulating valve 13, line 18, valve 25 and line 26 where it is ultimately brought into contact with the catalytic material 27. Such priming of the system by selective positioning of the container 9, the line 12, the regulating valve 13 and the catalytic material 27 is a presently preferred arrangement for priming the system. However, it should be evident that priming by other means, such as by mechanical means, is also possible. Well known priming devices, such as deformable bulbs placed in tandem with the line to be primed, may be used.

Exposure of the hydrogen peroxide to the catalytic material 27 gives rise to an exothermal reaction which produces oxygen and water vapor. The temperature of the catalytic material 27 increases substantially, with most of the heat being radiated into the ambient atmosphere as well as being diverted to the mass of the housing 49 by means of heat sinks or conductive retainers 55.

The water vapor resulting from the conversion reaction enters container or collecting tank 30, where it undergoes a first condensation which is aided by the diverting effect exerted by the baffle or projection 32.

As the conversion process continues, the pressure increases in the collecting tank or container 30. Line 33 and tube 34 feed back the pressure in container 30 to the hydrogen peroxide container 9, thereby equilizing the pressures therebetween. The increased pressures exerted by the oxygen circuit within the hydrogen peroxide container 9 forces hydrogen peroxide to flow through line 12 at an increased rate and enter the reaction or conversion section 27. The pressure of the oxygen produced by the system thus increases rapidly to reach a predetermined operating value.

The hot and still moist oxygen accumulating in container 30 discharges from the latter through line 38 through coil 37, wherein it exchanges a substantial part of its own heat with mass 8 of the hydrogen peroxide, which disperses it through the container 9. The oxygen and the remaining water vapors are then forced through line 39 and tube 45 into the lower part of the condensation unit 40. Here, the gases emerge following a winding course through the holes 44 of diaphragm 43, undergoing a further effective cooling step. At this stage, most of the water vapor has been sufficiently cooled to condense, the mostly pure oxygen passing from the condensation unit 40 through unidirectional valve 48 in line 7 to blow pipe or torch 4 where Flame F has been shown to be ignited as a result of the opening of the valve 5 which controls the flow of combustion gas coming from the source or gas cartridge 1. By suitably adjusting the valve 6, it is possible to regulate the rate of oxygen that flows to the flame and, therefore, to adapt the latter to the requirements of a particular application.

An important feature of the present invention is that if the pressure in the oxygen production circuit exceeds the predetermined operating value, such as when the valve 6 is closed, the hydrogen peroxide regulating valve 13 automatically intervenes, and adversely proportionally reduces the quantity of hydrogen peroxide allowed to flow into the reaction circuit or catalytic conversion unit 27. In this manner, the pressure of the oxygen produced never exceeds a maximum safety value. As noted previously, it becomes clear that if a pressure is produced in chamber 14 which exceeds the back pressure exerted by spring 19, the flexible member 15 is deformed and is displaced to the right, as viewed in FIG. 3, compressing spring 19 and valve 16 limits the flow of hydrogen peroxide between lines 12 and 18.

It is possible to provide an instrument in association with the registration screw 20 for direct visualization of the pressure existing in the oxygen production circuit, such calibrated instrument or scale making it possible to vary the pressure in the oxygen circuit as desired by acting on the screw.

In any case, if an abrupt and abnormal increase in pressure takes place, valve 11 intervenes, discharging the excess pressure itself into the atmosphere.

Unidirectional valve 25 performs a number of functions. Firstly, it prevents a feed-back of pressure towards the fluid regulating unit 13, thereby protecting the latter from contact with solid material particles which may be released by the catalytic converter unit 27. This would possibly damage the generally delicate unit 13. Additionally, the valve 25 exerts a continuous dosing on the hydrogen peroxide flowing towards the reaction circuit 27.

The simplicity and safety of use of the equipment according to the present invention become evident. No regulating operations are required of the operator. The user need only periodically monitor the levels of the liquids in containers 9, 30 and 41, discharge the condensates from containers 30 and 41 periodically, and restore the level of hydrogen peroxide in container 9 when the level falls below a predetermined level.

To deactivate the equipment, it is sufficient to turn the screw 22 fully inwardly and/or close oxygen valve 6. As suggested above, turning in of the screw 22 directly terminates the flow of hydrogen peroxide through lines 12, 18 by moving the conical valve 16 into a position to block the opening 16a between chambers 14, 17. Closing of the oxygen valve 6, on the other hand, has the same ultimate effect. Once oxygen is no longer allowed to escape through the torch 4, the pressure within the oxygen system continues to increase, this increasing the pressures throughout the system including the pressures exhibited by the hydrogen peroxide in the chamber 14 of the regulating valve 13. As described above, such increased pressures in the chamber 14 will also cause the conical valve 16 to block fluid flow between chambers 14 and 17.

During the cooling phase of the oxygen-producing plant, a depression will gradually tend to be established within the same which could cause a dangerous deformation of various components of the circuit itself. Unidirectional valve 47 avoids this difficulty, since as soon as the pressure within the circuit rises above atmospheric pressure this places the circuit itself in free communication with the atmosphere.

Figure 6:
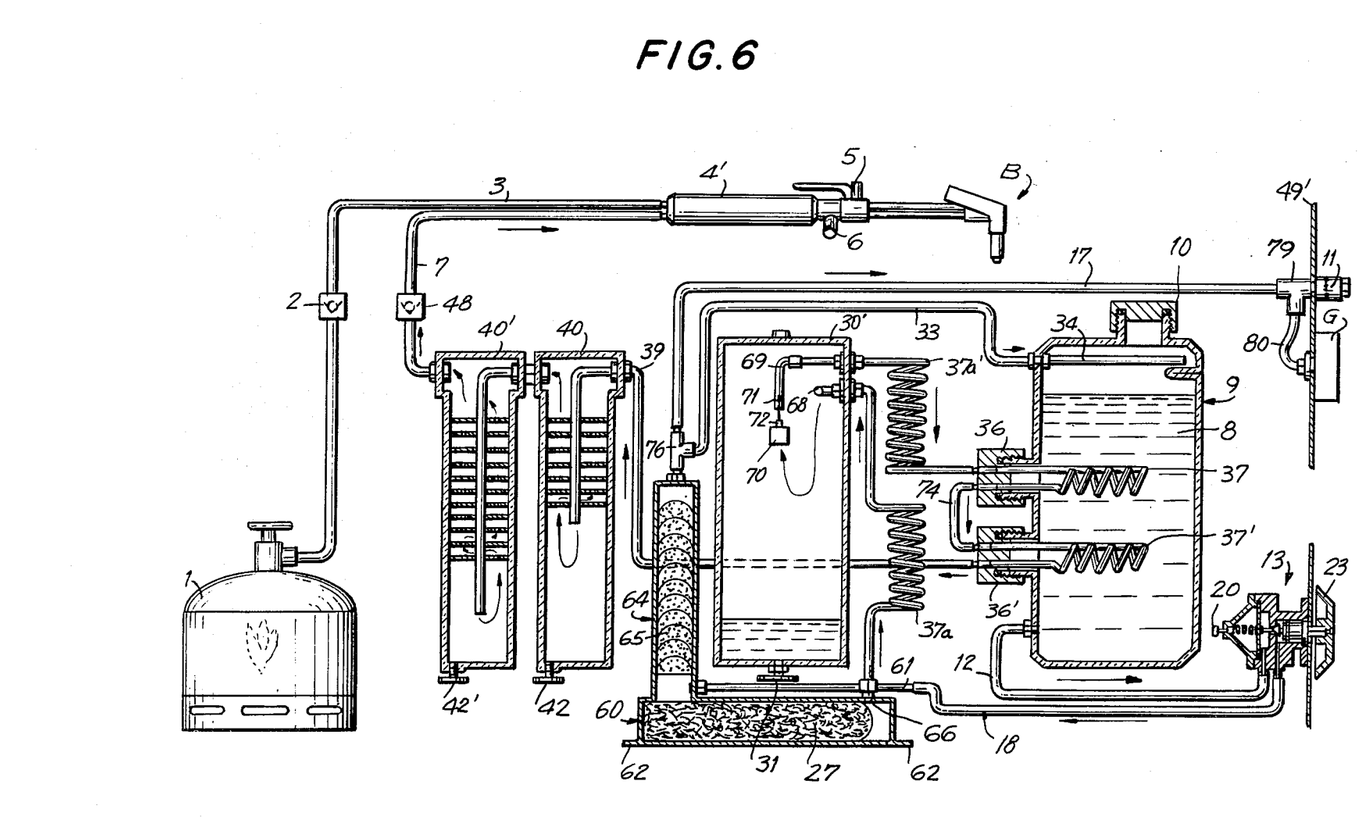
FIG. 6 is a view similar to FIG. 1, but showing another embodiment of the present invention which has a greater oxygen producing capacity for use in more demanding applications.
Figure 7:
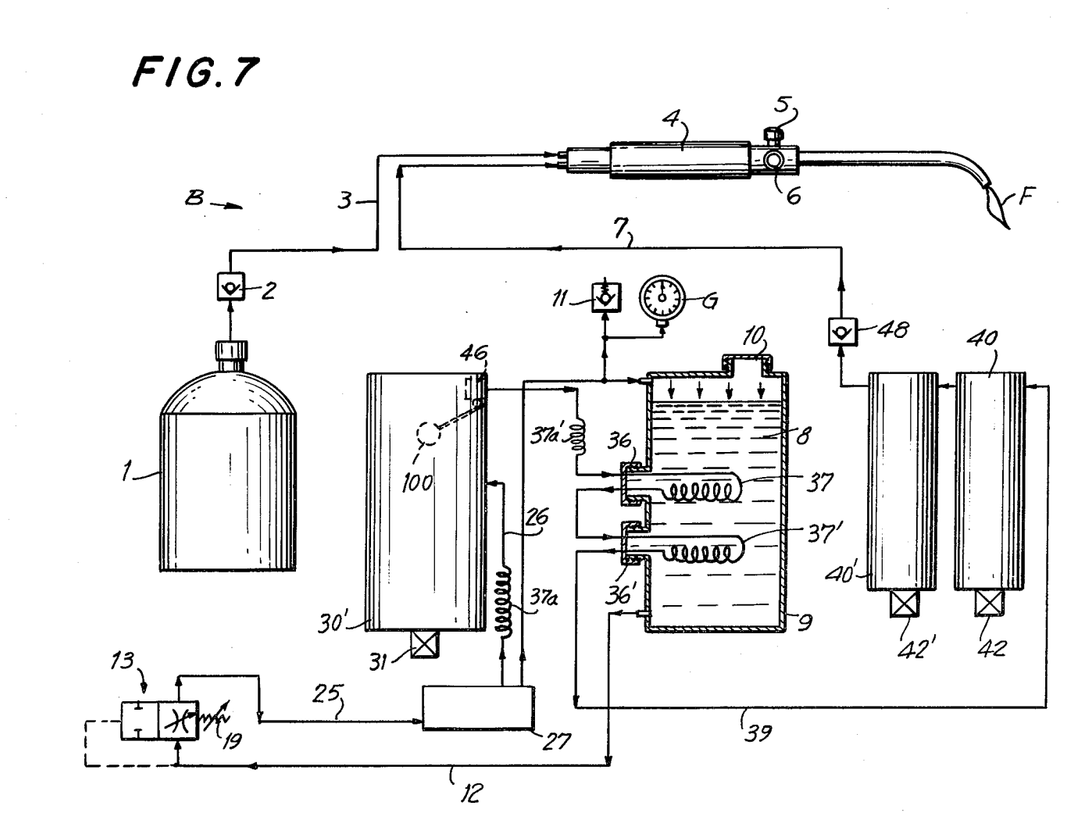
FIG. 7 is similar to FIG. 2, but showing the flow directions in the embodiment of FIG. 6.
Figure 8:
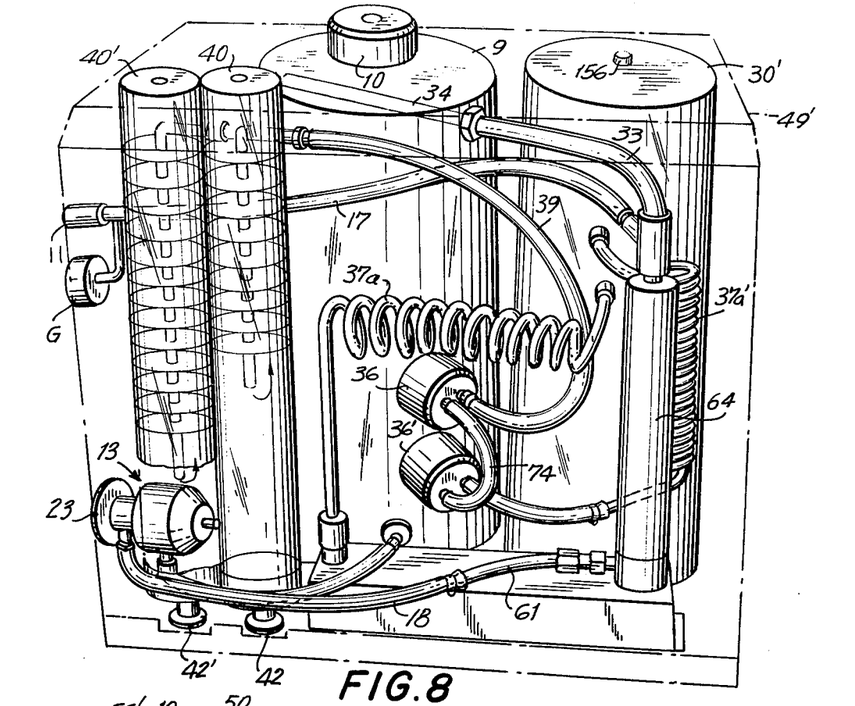
FIG. 8 is similar to FIG. 4, but showing the embodiment of FIGS. 6 and 7.
Figures 9, 10, 11:
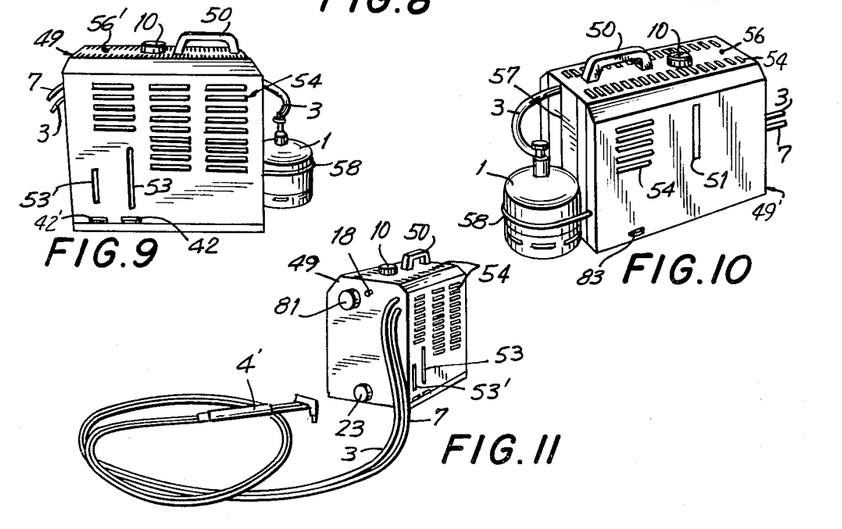
FIG. 9 is a perspective side elevational view of the embodiment shown in FIGS. 6-8 and illustrating the functional aspects of the unit accessible exterially of the housing.
FIG. 10 is similar to FIG. 9, also showing the manner in which the fuel tank may be attached to the housing.
FIG. 11 is similar to FIG. 10, but showing the front panel of the housing and the controls associated therewith.

Referring to FIGS. 6–8, another embodiment B of the invention is shown which has the capacity of producing greater amounts of oxygen. The principle of operation is, however, the same as described for the first embodiment A. The second embodiment B includes a catalytic conversion member 60 which is generally L-shaped as shown and includes, in addition to the previously described catalytic section 21, a portion 64 which may include catalytic particles and/or condensation/filtration elements 65.

The main body portion 27 of the catalytic conversion member advantageously includes a metallic heat conductive wall or base 62 which forms flanges secured to the housing 49 so as to provide a heat sink for the heat generated in the catalytic converter. The line 18 feeds into a line or conduit 61 through which the hydrogen peroxide flows into the L-shaped catalytic converter 60. The oxygen and water vapor, as before, are released at 66 where there is provided a heat exchanger in the nature of coil 37a exposed to the ambient air. The coil 37a feeds into the collecting tank or container 30' at 68. The water which condenses within the tank 30' is collected at the bottom of the tank as before. However, there is now also provided a conduit 69 which opens within the container 30' and feeds a second heat exchanger in the nature of a coil 37a' which is also exposed to the ambient air. The coil 37a' is connected in tandem with the coil 37a as well as with coils 37 and 37' which are supported within plugs 36 and 36' and immersed in the hydrogen peroxide mass 8 as shown.

The output of the coil 37' feeds, by means of line 39, condensation units 40 and 40' which are also connected in tandem. The provision of the additional cooling coils 37a, 37a', 37 and 37', as well as the increased numbers of condensation units provides additional cooling and condensation for the increased amount of water vapor generated in the larger L-shaped catalyst 60. Proportionally larger quantities of oxygen, of course, are also released during the conversion process.

The volumetric decrease in conversion from hydrogen peroxide to water is approximately 80%. The collecting tanks or containers 30' must, therefore, be dimensioned to accommodate the anticipated quantity of water condensate. Since the quantity of hydrogen peroxide should not drop below the levels of the cooling coils which are immersed therein, for safety reasons, the collecting tanks or containers 30' should be sufficently large to receive a volume of water equal to approximately 80% of the volume of hydrogen peroxide situated above the highest cooling coil, such as coil 37 in FIG. 6. In FIGS. 6 and 7, means are provided for pressurizing the oxygen circuit at the output of the catalyst 27 to thereby terminate the conversion process, as described above, whenever the level of condensate collected in the tanks or containers 30' rises above a selected level. The level selected must be such that condensate is prevented from flowing into the cooling circuits, including the output 68 of the cooling coil 37a or the input 69 of the cooling coil 37a'. In FIG. 6, the method used for this purpose is a plug 70 moveable with respect to the conduit 71 by means of a guide element 72 which guides the same in the upward and downward directions. The plug or stopper 70 is made of such a material so that buoyant forces raise the stopper upwardly by a rising level of condensation and, when the critical level is reached, the stopper plugs up the opening of the conduit 71 thereby preventing further escape of oxygen and water vapor out of the tank or container 30'. This causes increased pressures within the oxygen generating circuit to ultimately cause a closure in the hydrogen peroxide path in the fluid regulating valve 13 as described above.

In FIG. 7 an alternate means is shown for terminating operation of the apparatus when the condensate level in the container 30' rises above a predetermined value. Here, a float 100 is shown which is connected to the container 30' for pivoting movements in upward and downward directions. When the condensate level rises to the critical point, the pivoting arm of the float 100 actuates a fluid switch or valve 46 which closes the fluid path to the cooling coil 37a'.

The section 64 of the catalytic conversion member 60 is also shown in FIG. 6 to be provided with a T-shaped connector 76 which, on the one hand, applies the oxygen and water vapor pressure within the catalytic element 60 to the container 9 by means of line or conduit 33 and rigid tube 34. The oxygen and water vapor pressure within the catalytic converter member 60 is also communicated to a blow-off valve 11 and to a pressure gauge G by means of T-shaped connector 79 and conduit 80.

It will be clear that any hydrogen peroxide anywhere within the L-shaped catalytic converter will be converted into water vapor and oxygen. Additionally, any water within the catalytic converter will, because of the high temperatures reached in the converter, be converted into steam and expelled either through the line 33 or at 66 into the tandem cooling coils as described.

Referring to FIGS. 8-11, there is shown a possible arrangement of the elements which have been described in connection with FIGS. 6 and 7. Because the embodiment B is a higher capacity unit, utilizing greater quantities of oxygen and fuel gas, the gas tank 1 is preferably mounted exteriorly of the housing 49' as shown. Otherwise, the exterior controls and visual indicating features are the same as with the previously described embodiment A.

Generally, the smaller units A have a maximum capacity of approximately 250 liters of oxygen per hour while the maximum capacity of the larger units B is approximately 1000 liters of oxygen per hour. With both units A and B flame temperatures as high as 3100° C. can be obtained when using acetylene and therefore it is possible to weld iron to iron. Using propane and other LPG fuels average flame temperatures of 2700° C.–2850° C., suitable for cutting, brazing and heating, can be achieved. Typically 1 kg. of hydrogen peroxide can yield 300 IT calories continuously for approximately 45 minutes. With 8 kg. hydrogen peroxide tanks, for example, with 5.5 kg. used for cooling (level up to highest cooling coil 37) and 2.5 kg. used for consumption, the welding process can proceed continuously for almost two hours. The cutting capacity of the larger units is approximately 20 mm. max. while with the smaller units the cutting capcity is up to 10 mm. max.

Suitable pressure reducers (not shown) may be used for various types of gas cartridges or cylinders and should be adjusted from a minimum of 0.5 to 0.6 Atm. (BAR) max. The equal pressure design virtually eliminates the possibility of back-fire.

The maximum oxygen pressure achievable is a function of the size of the catalytic section 27 as well as the settings of the screw 20. On the larger units oxygen pressures of 2.5 Atm. (BAR) max. are possible.

It is to be understood that the foregoing description and accompanying drawings have been given only by way of illustration and example, and that alterations and changes in the present disclosure, which will be readily apparent to one skilled in the art, are contemplated as within the scope of the present invention, which is limited only by the claims which follow.

Thus, while the embodiments described include a supply of fuel which is mixed with the generated oxygen to provide an oxygen-gas flame, the invention also contemplates the use of a decomposable liquid which is capable of yielding any combustible gas which may or may not be combined with an additional gaseous product emmanating from a source integrated within the system. The generation of oxygen and the mixing of the oxygen with fuel from a supply forming part of the system is a special case and an example of the broader applicability of the present invention which is defined in the claims that follow.

I claim:

1. Autogenous portable welding apparatus comprising a container for receiving a readily decomposable liquid capable of yielding a combustible gas; conversion means having an input thereof connected to said container for receiving the decomposable liquid and for effecting conversion at a rate which is a function of the rate of flow of the decomposable liquid thorough said conversion means; means for selectively releasing the combustible gas to a torch; conduit means for transmitting the increased pressures developed at the output of said conversion means during the conversion process to said container to increase the rate of flow of the decomposable liquid through said conversion means; and liquid flow control means disposed between said container and said conversion means for regulating the flow of the decomposable liquid through said conversion means as a function of the pressure in said container to thereby maintain a desired gas generation rate.

2. An apparatus as defined in claim 1, further comprising priming means for initially injecting quantities of the decomposable liquid into said conversion means to thereby initiate the conversion process and achieve levels of pressure in said container which render the conversion process self-sustaining.

3. An apparatus as defined in claim 2, wherein said priming means comprises mechanical means.

4. An apparatus as defined in claim 2, wherein said conversion means is disposed relative to said container to cause the decomposable liquid to flow into said conversion means as a result of gravitational forces to thus provide priming.

5. An apparatus as defined in claim 1, wherein said liquid flow control means comprises first and second chambers in fluid flow communication with each other through an opening, said first chamber communicating with said container for receiving the decomposable liquid and said second chamber communicating with said conversion means; an elastic membrane defining one of the walls of said first chamber adapted to be deflected as a function of the pressure in said first chamber; a conical valve connected to said elastic membrane configurated to at least partially close said opening when inserted therein, whereby increases in pressure in said first chamber initially reduce and ultimately stops the flow of fluid through said opening.

6. An apparatus as defined in claim 5, further comprising biassing means for restoring said elastic membrane to its normal position when fluid pressures in said first chamber are reduced.

7. An apparatus as defined in claim 6, wherein said biassing means comprises a helical compression spring connected to said elastic membrane.

8. An apparatus as defined in claim 6, further comprising pre-stressing means for adjustably setting the restoring forces on said elastic membrane.

9. An apparatus as defined in claim 5, further comprising manual adjusting means coupled to said conical valve for manually setting the position of said conical valve and thereby control the flow of fluid from said first to said second chambers.

10. An apparatus as defined in claim 1, further comprising at least one maximum pressure calibrated valve for monitoring the pressure of the combustible gas and venting the same to the atmosphere whenever the pressure thereof exceeds a predetermined maximum pressure.

11. An apparatus as defined in claim 10, wherein said container has a plug and said calibrated valve is provided on said plug.

12. An apparatus as defined in claim 1, further comprising a unidirectional valve in the fluid flow path between said liquid flow control means and said conversion means for preventing flow of the decomposable liquid from said conversion means to said liquid flow control means.

13. An apparatus as defined in claim 1, wherein the readily decomposable liquid is hydrogen peroxide and the combustible gas is oxygen, further comprising means for providing gas fuel at the welding torch for combustion with the oxygen.

14. An apparatus as defined in claim 13, wherein said conversion means comprises a catalytic agent provided in the fluid flow path of the hydrogen peroxide.

15. An apparatus as defined in claim 14, wherein said catalytic agent comprises galvanically treated lead chips.

16. An apparatus as defined in claim 13, wherein decomposition of the hydrogen peroxide also yields water vapor as a by-product, and further comprising a collecting tank connected to said conversion means for receiving the oxygen and water vapor and for storing the water resulting from condensation of the water vapor.

17. An apparatus as defined in claim 16, wherein said conduit means connects said container and said collecting tank for equalizing the pressures therebetween.

18. An apparatus as defined in claim 16, wherein said collecting tank is provided with a deflecting member at the path of entry of the oxygen and water vapor into said collecting tank to enhance condensation of the water vapor.

19. An apparatus as define in claim 16, further comprising at least one condensation unit in fluid flow communication with said collecting tank for condensing the water vapor not yet condensed in said collecting tank to thereby purify the oxygen of undesired moisture.

20. An apparatus as defined in claim 19, further comprising a housing enclosing the welding apparatus including said container, collecting tank and at least one condensation unit, said housing having vertical slits proximate to said container, collecting tank and at least one condensation unit to allow observation of the levels of liquids therein.

21. An apparatus as defined in claim 19, wherein a plurality of condensation units are connected in tandem at the output of said collecting tank for increasing condensation prior to release of the oxygen at the welding torch.

22. An apparatus as defined in claim 16, further comprising at least one condensation unit provided with an interior baffle which compels a winding course of the water vapor resulting in increased cooling thereof, said at least one condensation unit being provided with a drainage valve for draining the water which condenses and accumulates therein.

23. An apparatus as defined in claim 22, wherein a plurality of condensation units are connected in tandem at the output of said collecting tank for increasing condensation prior to release of the oxygen at the welding torch.

24. An apparatus as defined in claim 22, wherein said means for releasing said oxygen to the torch is connected to said condensation unit.

25. An apparatus as defined in claim 16, further comprising at least one heat exchanger between said collecting tank and said condensation unit for cooling the water vapor.

26. An apparatus as defined in claim 25, wherein said at least one heat exchanger comprises a coil immersed in the decomposable liquid which serves as a heat dispersing vehicle.

27. An apparatus as defined in claim 25, wherein a plurality of heat exchangers are connected in tandem between said collecting tank and said condensation unit.

28. An apparatus as defined in claim 27, wherein all heat exchangers comprise coils immersed in the decomposable liquid.

29. An apparatus as defined in claim 27, wherein said heat exchangers are coils at least some of which are immersed in the decomposable liquid and the balance of which exposed to ambient air.

30. An apparatus as defined in claim 13, further comprising a unidirectional valve in the flow path of the gas fuel to permit the flow of gas fuel only in the direction of the welding torch.

31. An apparatus as defined in claim 13, further comprising valves at the welding torch for selective regulation of both the flow of oxygen and gas fuel.

32. Autogenous portable apparatus for welding and for oxygen-cutting operations utilizing a combustible gas fuel, of any suitable known type, and oxygen derived from the decomposition of hydrogen peroxide flowing from a container for reacting with a suitable reaction material, the improvement being characterized by priming means for injecting initial quantities of hydrogen peroxide from the hydrogen peroxide container to said reaction material; a conduit for applying the pressure of the oxygen at the output of said reaction material to said hydrogen peroxide container to pressurize the same and cause, once primed, increasing quantities of oxygen to be produced until the desired level of oxygen production has been reached; and automatic regulating means for regulating the pressure of the oxygen and maintaining the same below a maximum predetermined value.

* * * * *